US012754335B2

(12) United States Patent
Xu et al.

(10) Patent No.: US 12,754,335 B2
(45) Date of Patent: Oct. 6, 2026

(54) MULTI-DIMENSIONAL INTEGRATED MONITORING SYSTEM AND METHOD FOR UNDERGROUND ENGINEERING

(71) Applicant: SICHUAN UNIVERSITY, Chengdu (CN)

(72) Inventors: Nuwen Xu, Chengdu (CN); Haoyu Mao, Chengdu (CN); Peiwei Xiao, Chengdu (CN); Biao Li, Chengdu (CN); Bin Duan, Chengdu (CN); Zhi Li, Chengdu (CN); Xiang Zhou, Chengdu (CN); Xin Li, Chengdu (CN); Yuepeng Sun, Chengdu (CN); Zhuang Li, Chengdu (CN); Jianjun Chen, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 19/399,697

(22) Filed: Nov. 25, 2025

(65) Prior Publication Data

US 2026/0110814 A1 Apr. 23, 2026

Related U.S. Application Data

(63) Continuation of application No. PCT/CN2025/123008, filed on Sep. 22, 2025.

(30) Foreign Application Priority Data

Oct. 21, 2024 (CN) ......................... 202411463449.1

(51) Int. Cl.
*G01V 1/30* (2006.01)
*G01V 1/00* (2024.01)

(52) U.S. Cl.
CPC .............. *G01V 1/306* (2013.01); *G01V 1/003* (2013.01); *G01V 1/303* (2013.01)

(58) Field of Classification Search
None
See application file for complete search history.

(56) References Cited

U.S. PATENT DOCUMENTS 12,123,995 B1 * 10/2024 Cao ........................ G01V 1/288

FOREIGN PATENT DOCUMENTS

CN 103017822 A * 4/2013
CN 109405880 A * 3/2019 ............. G01D 21/02

(Continued)

OTHER PUBLICATIONS

CN109405880A translation (Year: 2019).*

(Continued)

*Primary Examiner* — Lina Cordero
(74) *Attorney, Agent, or Firm* — Bayramoglu Law Offices LLC

(57) ABSTRACT

A multi-dimensional integrated monitoring system and method for underground engineering. The system includes point monitoring modules mounted on a plurality of first monitoring sections, linear monitoring modules mounted on a plurality of second monitoring sections, a planar monitoring module mounted on a tunnel face, and volumetric monitoring modules mounted on a plurality of third monitoring sections of the underground engineering; and a data analysis platform for receiving and analyzing first feature information collected by the point monitoring modules, second feature information collected by the linear monitoring modules, third feature information collected by the planar monitoring module, and fourth feature information collected by the volumetric monitoring modules. By means of the system, the problems that a unified system with (Continued)

mutual coupling of monitoring methods is not formed in the underground engineering, and the overall condition of the engineering cannot be fully reflected are solved.

10 Claims, 10 Drawing Sheets

(56) References Cited

FOREIGN PATENT DOCUMENTS

| | | | | | |
|---|---|---|---|---|---|
| CN | 111505733 A | * | 8/2020 | ............... | G01V 8/00 |
| CN | 114720167 A | * | 7/2022 | .......... | G01M 99/007 |
| CN | 116521777 A | * | 8/2023 | ........... | G06F 16/258 |

OTHER PUBLICATIONS

CN103017822A translation (Year: 2013).*
CN111505733A translation (Year: 2020).*
CN114720167A translation (Year: 2022).*
CN116521777A translation (Year: 2023).*

* cited by examiner

MULTI-DIMENSIONAL INTEGRATED MONITORING SYSTEM AND METHOD FOR UNDERGROUND ENGINEERING

CROSS REFERENCE TO THE RELATED APPLICATIONS

This application is a continuation application of International Application No. PCT/CN2025/123008, filed on Sep. 22, 2025, which is based upon and claims priority to Chinese Patent Application No. 202411463449.1, filed on Oct. 21, 2024, the entire contents of which are incorporated herein by reference.

TECHNICAL FIELD

The present disclosure relates to the technical field of underground engineering safety monitoring, and in particular to a multi-dimensional integrated monitoring system and method for underground engineering.

BACKGROUND

With the continuous construction of numerous highway engineering and hydropower engineering in China, a large quantity of underground engineering is formed. During a construction process of the underground engineering, there are often many challenges such as surrounding rock deformation, rockburst and collapse, which severely delay a construction period and affect the safety of personnel and equipment. Current monitoring technologies primarily rely on "point" monitoring or "linear" monitoring methods, which serve as non-relevant independent methods for monitoring, and overall and comprehensive monitoring is not achieved, so that the staff cannot comprehensively understand the state and change trend of the underground engineering.

SUMMARY

With regard to the above problems, one of the objects of the present disclosure is to provide a multi-dimensional integrated monitoring system for underground engineering, so as to solve the problems that a unified system with mutual coupling of monitoring methods is not formed in the underground engineering, and the overall condition of the engineering cannot be fully reflected. A second object of the present disclosure is to provide a multi-dimensional integrated monitoring method for underground engineering, so as to achieve monitoring in multiple dimensions and improve the comprehensiveness and fullness of the monitoring system.

In order to achieve one of the objects, in a first aspect of the present disclosure, a multi-dimensional integrated monitoring system for underground engineering is provided, and the adopted technical solution is as follows:

a multi-dimensional integrated monitoring system for underground engineering, is configured to be assembled to underground engineering to be excavated, and the system includes:

point monitoring modules configured to be mounted on a plurality of first monitoring sections of the underground engineering;

linear monitoring modules configured to be mounted on a plurality of second monitoring sections of the underground engineering;

a planar monitoring module configured to be mounted on a tunnel face of the underground engineering; and volumetric monitoring modules configured to be mounted on a plurality of third monitoring sections of the underground engineering; and a data analysis platform configured for receiving and analyzing first feature information collected by the point monitoring modules, second feature information collected by the linear monitoring modules, third feature information collected by the planar monitoring module, and fourth feature information collected by the volumetric monitoring modules, so as to adjust an excavation and support scheme for the underground engineering; wherein the plurality of first monitoring sections and the plurality of second monitoring sections are respectively provided at intervals along an excavation direction of the underground engineering; and the plurality of third monitoring sections are respectively positioned in risk areas characterized by the third feature information and areas close to the tunnel face.

Optionally, each of the point monitoring modules includes a plurality of multipoint displacement meters and/or a plurality of anchor rod stress meters; and each of the plurality of multipoint displacement meters is configured for collecting displacement information about the underground engineering, each of the anchor rod stress meters is configured for collecting stress information about the underground engineering, and the first feature information includes the displacement information and/or the stress information;

each of the linear monitoring modules includes a plurality of acoustic wave detectors and/or a plurality of borehole panoramic digital imagers; and each of the plurality of acoustic wave detectors is configured for collecting acoustic wave information about the underground engineering, each of the plurality of borehole panoramic digital imagers is configured for collecting imaging information about the underground engineering, and the second feature information includes the acoustic wave information and/or the imaging information;

the planar monitoring module includes a plurality of advanced geological prediction geophones and/or a plurality of seismic imagers, and each of the plurality of advanced geological prediction geophones is configured for collecting seismic data information about the underground engineering; and each of the plurality of seismic imagers is configured for collecting seismic wave information about the underground engineering, and the third feature information includes the seismic data information and/or the seismic wave information;

each of the volumetric monitoring modules includes a plurality of microseismic sensors, each of the plurality of microseismic sensors is configured for collecting fracture information about the underground engineering, and the fourth feature information includes the fracture information;

wherein the seismic data information includes at least one of relative stress, water-bearing probability, a longitudinal wave velocity, a transverse wave velocity, a longitudinal-to-transverse wave velocity ratio, Poisson's ratio, Young's modulus and a surrounding rock hazard level result map; and the seismic wave information includes at least one of wave velocity distribution, a three-dimensional image and an abnormal area; and the fracture information includes at least one of a microseismic event, seismic magnitude, a microseismic frequency and microseismic waveform.

Optionally, the underground engineering includes isolinear engineering;

the plurality of multipoint displacement meters are arranged on two side walls, a crown and two side arch shoulders of each of the plurality of first monitoring sections of the isolinear engineering, and each of the plurality of anchor rod stress meters is arranged between two adjacent multipoint displacement meters on each of the plurality of first monitoring sections;

the plurality of acoustic wave detectors and the plurality of borehole panoramic digital imagers are respectively arranged on two side walls and a crown of each of the plurality of second monitoring sections of the isolinear engineering;

the plurality of advanced geological prediction geophones are arranged in an array on the tunnel face of the isolinear engineering, and seismic source excitation points are arranged between two adjacent advanced geological prediction geophones and at edges of an array of the plurality of advanced geological prediction geophones; and the plurality of microseismic sensors are arranged on two side walls of each of the plurality of third monitoring sections of the isolinear engineering, and positioned at different heights on the plurality of third monitoring sections.

Optionally, the underground engineering includes high side wall engineering;

the plurality of multipoint displacement meters are arranged on two side walls, a crown and two side arch shoulders of each of the plurality of first monitoring sections on a first layer of the high side wall engineering, and on two side walls of each of the plurality of first monitoring sections on each layer except for the first layer; and each of the plurality of anchor rod stress meters is arranged between two adjacent multipoint displacement meters on each of the plurality of first monitoring sections;

the plurality of acoustic wave detectors and the plurality of borehole panoramic digital imagers are respectively arranged on two side walls and a crown of each of the plurality of second monitoring sections on the first layer of the high side wall engineering, and on two side walls of each of the plurality of second monitoring sections on each layer except for the first layer;

the plurality of advanced geological prediction geophones are arranged in an array on the tunnel face of the high side wall engineering, and seismic source excitation points are provided between two adjacent advanced geological prediction geophones and at edges of an array of the plurality of advanced geological prediction geophones; and the plurality of seismic imagers are arranged in areas on the first layer of the high side wall engineering corresponding to bottoms of the two side walls; and the plurality of microseismic sensors are dispersedly arranged in different areas of the plurality of third monitoring sections on at least two layers of the high side wall engineering.

In order to achieve another one of the objects, in a second aspect of the present disclosure, a multi-dimensional integrated monitoring method for underground engineering is provided, and the adopted technical solution is as follows:

a multi-dimensional integrated monitoring method for the underground engineering, is implemented based on the multi-dimensional integrated monitoring system for the underground engineering according to any one of claims 1 to 4, and the method includes:

selecting the underground engineering to be excavated, and excavating to obtain the tunnel face;

setting the plurality of first monitoring sections and the plurality of second monitoring sections at intervals along the excavation direction of the underground engineering;

mounting the point monitoring modules on the plurality of first monitoring sections to collect the first feature information about the underground engineering;

mounting the linear monitoring modules on the plurality of second monitoring sections to collect the second feature information about the underground engineering;

mounting the planar monitoring module on the tunnel face to collect the third feature information about the underground engineering;

determining the risk areas of the underground engineering based on the third feature information;

setting the plurality of third monitoring sections of the underground engineering according to positions of the risk areas and the tunnel face;

mounting the volumetric monitoring modules on the plurality of third monitoring sections to collect the fourth feature information about the underground engineering; and receiving and analyzing the first feature information, the second feature information, the third feature information and the fourth feature information by the data analysis platform to adjust the excavation and support scheme for the underground engineering.

Optionally, the mounting the point monitoring modules on the plurality of first monitoring sections to collect the first feature information about the underground engineering, includes:

mounting a plurality of multipoint displacement meters and/or a plurality of anchor rod stress meters on the plurality of first monitoring sections to collect displacement information and/or stress information about the underground engineering; wherein the mounting the linear monitoring modules on the plurality of second monitoring sections to collect the second feature information about the underground engineering, includes:

mounting a plurality of acoustic wave detectors and/or a plurality of borehole panoramic digital imagers on the plurality of second monitoring sections to collect acoustic wave information and/or imaging information about the underground engineering; wherein the mounting the planar monitoring module on the tunnel face to collect the third feature information about the underground engineering, includes:

mounting a plurality of advanced geological prediction geophones on the tunnel face, exciting seismic sources point by point according to a preset sequence at seismic source excitation points, and collecting seismic data information about the underground engineering; the seismic data information including at least one of relative stress, water-bearing probability, a longitudinal wave velocity, a transverse wave velocity, a longitudinal-to-transverse wave velocity ratio, Poisson's ratio, Young's modulus and a surrounding rock hazard level result map; and/or mounting a plurality of seismic imagers on the tunnel face to collect seismic wave information about the underground engineering; the seismic wave information including at least one of wave velocity distribution, a three-dimensional image and an abnormal area; wherein the mounting the volumetric monitoring modules on the plurality of third monitoring sections to collect the fourth feature information about the underground engineering, includes:

mounting a plurality of microseismic sensors on the third monitoring sections to collect fracture information about the underground engineering; the fracture information including at least one of a microseismic event, seismic magnitude, a microseismic frequency and microseismic waveform.

Optionally, the underground engineering includes isolinear engineering;

the mounting the point monitoring modules on the plurality of first monitoring sections, includes:

drilling two side walls, a crown and two side arch shoulders of each of the plurality of first monitoring sections of the isolinear engineering to form a plurality of mounting holes, mounting the plurality of multipoint displacement meters in some of the plurality of mounting holes, and mounting an anchor rod stress meter in a mounting hole between two adjacent multipoint displacement meters;

the mounting the linear monitoring modules on the plurality of second monitoring sections, includes:

drilling two side walls and a crown of each of the plurality of second monitoring sections of the isolinear engineering to form a plurality of detection holes, and respectively arranging the plurality of acoustic wave detectors and the plurality of borehole panoramic digital imagers in the plurality of detection holes;

the mounting the planar monitoring module on the tunnel face, includes:

drilling an array of holes on a tunnel face of the isolinear engineering to form a plurality of geophone holes, arranging an advanced geological prediction geophone in each of the plurality of geophone holes, and providing seismic source excitation points between two adjacent advanced geological prediction geophones and at edges of an array of the plurality of advanced geological prediction geophones; and the mounting the volumetric monitoring modules on the plurality of third monitoring sections, includes:

drilling at different heights on two side walls of each of the plurality of third monitoring sections of the isolinear engineering to form a plurality of fixing holes, and mounting the microseismic sensor in each of the plurality of fixing holes by means of a resin anchor agent.

Optionally, the underground engineering includes high side wall engineering;

the mounting the point monitoring modules on the plurality of first monitoring sections, includes:

drilling two side walls, a crown and two side arch shoulders of each of the plurality of first monitoring sections on a first layer of the high side wall engineering, and two side walls of each of the plurality of first monitoring sections on each layer except for the first layer to form a plurality of mounting holes, mounting the plurality of multipoint displacement meters in some of the mounting holes, and mounting an anchor rod stress meter in a mounting hole between two adjacent multipoint displacement meters;

the mounting the linear monitoring modules on the plurality of second monitoring sections, includes:

drilling two side walls and a crown of each of the plurality of second monitoring sections on the first layer of the high side wall engineering, and two side walls of each of the plurality of second monitoring sections on each layer except for the first layer to form a plurality of detection holes, and respectively arranging the plurality of acoustic wave detectors and the plurality of borehole panoramic digital imagers in the plurality of detection holes;

the mounting the planar monitoring module on the tunnel face, includes:

drilling an array of holes on a tunnel face of the high side wall engineering to form a plurality of geophone holes, arranging an advanced geological prediction geophone in each of the plurality of geophone holes, and providing seismic source excitation points between two adjacent advanced geological prediction geophones and at edges of an array of the plurality of advanced geological prediction geophones; and vertically drilling areas on the first layer of the high side wall engineering corresponding to bottoms of the two side walls to form imaging holes, and arranging the seismic imager in each of the imaging holes; and the mounting the volumetric monitoring modules on the plurality of third monitoring sections, includes:

respectively drilling different areas of the plurality of third monitoring sections on at least two layers of the high side wall engineering to form a plurality of fixing holes, and mounting the microseismic sensor in each of the plurality of fixing holes by means of the resin anchor agent.

Optionally, the mounting the volumetric monitoring modules on the plurality of third monitoring sections, further includes:

setting a target monitoring section close to a current tunnel face according to a position of the current tunnel face;

transferring the microseismic sensor on a third monitoring section away from the tunnel face among the plurality of third monitoring sections to the target monitoring section; and when the target monitoring section is positioned outside the risk areas, additionally providing the volumetric monitoring modules around rock masses positioned in the risk areas.

Optionally, the setting the plurality of first monitoring sections and the plurality of second monitoring sections at intervals along the excavation direction of the underground engineering, includes:

obtaining a surrounding rock quality level of the underground engineering through a geological exploration technology in an early stage;

setting a spacing distance corresponding to monitoring sections according to the surrounding rock quality level; and setting the plurality of first monitoring sections and the plurality of second monitoring sections according to the spacing distance; and the receiving and analyzing the first feature information, the second feature information, the third feature information and the fourth feature information by the data analysis platform, includes:

according to a plurality of preset monitoring durations, recording the first feature information, the second feature information, the third feature information and the fourth feature information corresponding to each of the plurality of preset monitoring durations, and transmitting recorded information to the data analysis platform.

Compared with the prior art, the present disclosure has at least the following significant improvements.

The system in the example of the present disclosure, coupled with four monitoring methods, namely, "point", "linear", "planar" and "volumetric" monitoring methods, collects and analyzes data of each dimension in real time in multiple dimensions, covering all the information from the point to the line, the plane and the three-dimension, provides comprehensive monitoring from the local to the whole and from the surface to the interior, and provides the most comprehensive monitoring data. Through the monitoring data of different dimensions, it is conducive to more comprehensive understanding of the state and change trend of underground engineering.

For the system in the example of the present disclosure, the four monitoring methods interact and complement each other in the monitoring process to provide more accurate and reliable analysis results and more continuous panoramic monitoring data, so as to form an efficient and integrated multi-dimensional monitoring system, so that the data collected from multiple dimensions can be mutually verified, and more comprehensive state information about the underground engineering is provided, thereby improving the accuracy of early warning and risk assessment.

For the method in the example of the present disclosure, the four monitoring methods are mounted to the underground engineering to complement each other, so that various key areas from the point, the line, the plane to the volume in the underground engineering are covered, spatial analysis of different scales from the micro to the macro is achieved, and comprehensive monitoring in time and space is achieved, thereby being conducive to thoroughly understanding the geology and engineering behavior of the underground engineering.

In summary, the system and method provided in the examples of the present disclosure may provide multi-level and multi-angle monitoring information, which may not only identify potential risks earlier, but also provide strong support for the safety management of the underground engineering, so as to optimize the excavation and support scheme and improve the safety and stability during the excavation process of the underground engineering. In practical applications, a more comprehensive, accurate and reliable underground engineering monitoring solution than independent monitoring methods is provided, thereby improving the comprehensive level of survey, design, scientific research and construction technology for the underground engineering.

BRIEF DESCRIPTION OF THE DRAWINGS

To better illustrate the technical solutions in the embodiments of the present disclosure or the prior art, a brief description to the accompanying drawings required for describing the embodiments or the prior art will be given below. Obviously, the accompanying drawings in the following description are some embodiments of the present disclosure, and for those of ordinary skill in the art, other accompanying drawings can also be obtained based on these drawings without exerting creative efforts.

DESCRIPTION OF REFERENCE NUMERALS

01. first monitoring section; 02. second monitoring section; 03. tunnel face; 04. third monitoring section; 05. risk area; 1. point monitoring module; 21. detection hole; 31. advanced geological prediction geophone; 311. seismic source excitation point; 32. seismic imager; 4. microseismic sensor; 5. upper-level drainage gallery; and 6. middle-level drainage gallery.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are part of the embodiments of the present disclosure, rather than all the embodiments. Based on the embodiments in the present disclosure, all other embodiments obtained by those of ordinary skill in the art without making creative efforts shall fall within the protection scope of the present disclosure.

It should be noted that nowadays, various monitoring methods only monitor stress or displacement at a specific point, so that a quantity of information is limited and the overall condition cannot be fully reflected. The biggest deficiency is that the various monitoring methods are usually operated independently, and are not related to each other. There are many types of monitoring methods, but they are not coupled, so that continuous monitoring data cannot be provided. Therefore, when the data collected by a single monitoring methods change, force changes or rock stratum geological changes have occurred in the rock mass. Even if monitoring is continued in combination with other monitoring methods, only the macroscopic damage that has occurred can be monitored, so that it is impossible to achieve wide-area early warning and take countermeasures in advance before the macroscopic damage occurs. Meanwhile, each monitoring method has greater limitations both in time and in space.

Therefore, in the excavation and support processes of underground engineering, it needs to provide more dynamic, real-time, accurate and comprehensive monitoring services, so as to master comprehensive and coherent state images of the underground engineering, and improve the accuracy of wide-area early warning and risk assessment. In view of this, referring to FIG. 1 and FIG. 2, FIG. 1 shows a system framework diagram of a multi-dimensional integrated monitoring system for underground engineering according to the present disclosure; and FIG. 2 shows a principle block diagram of the multi-dimensional integrated monitoring system for underground engineering according to the present disclosure.

Figure 1:
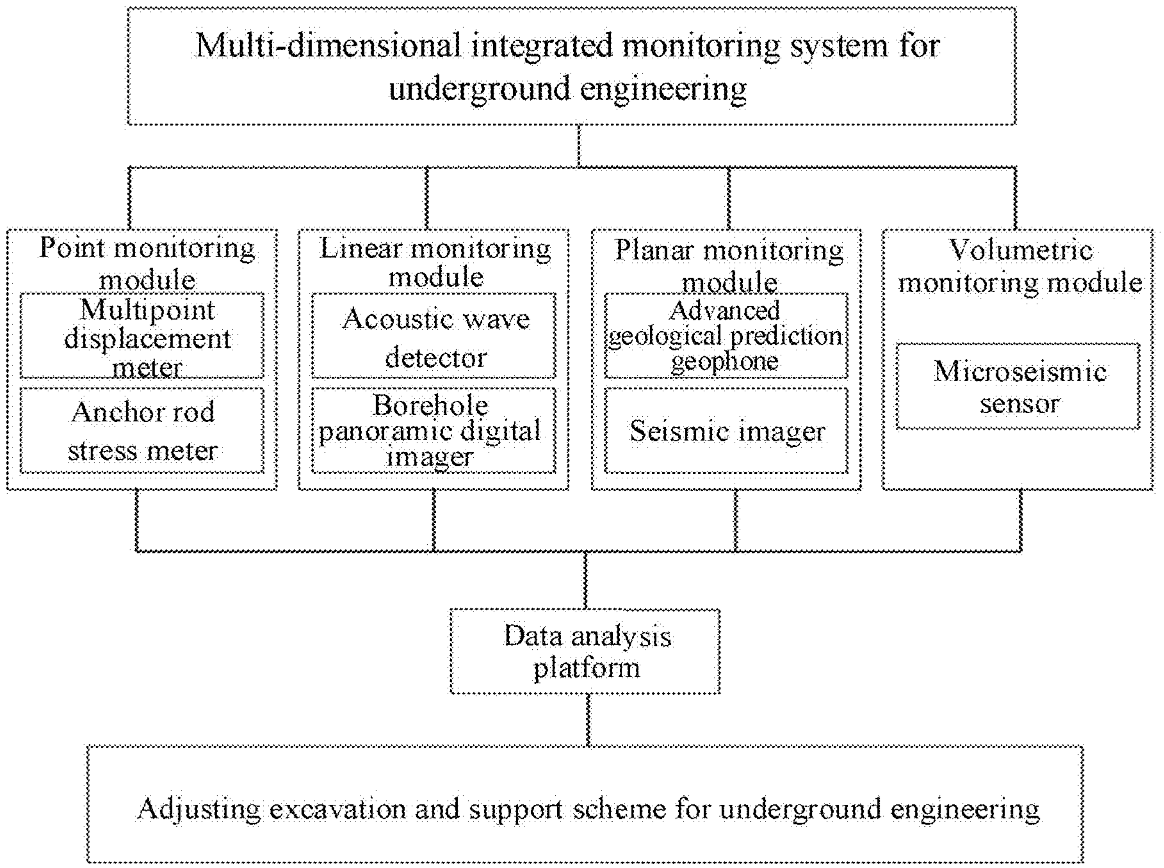
FIG. 1 is a system framework diagram of a multi-dimensional integrated monitoring system for underground engineering according to an embodiment of the present disclosure.
Figure 2:
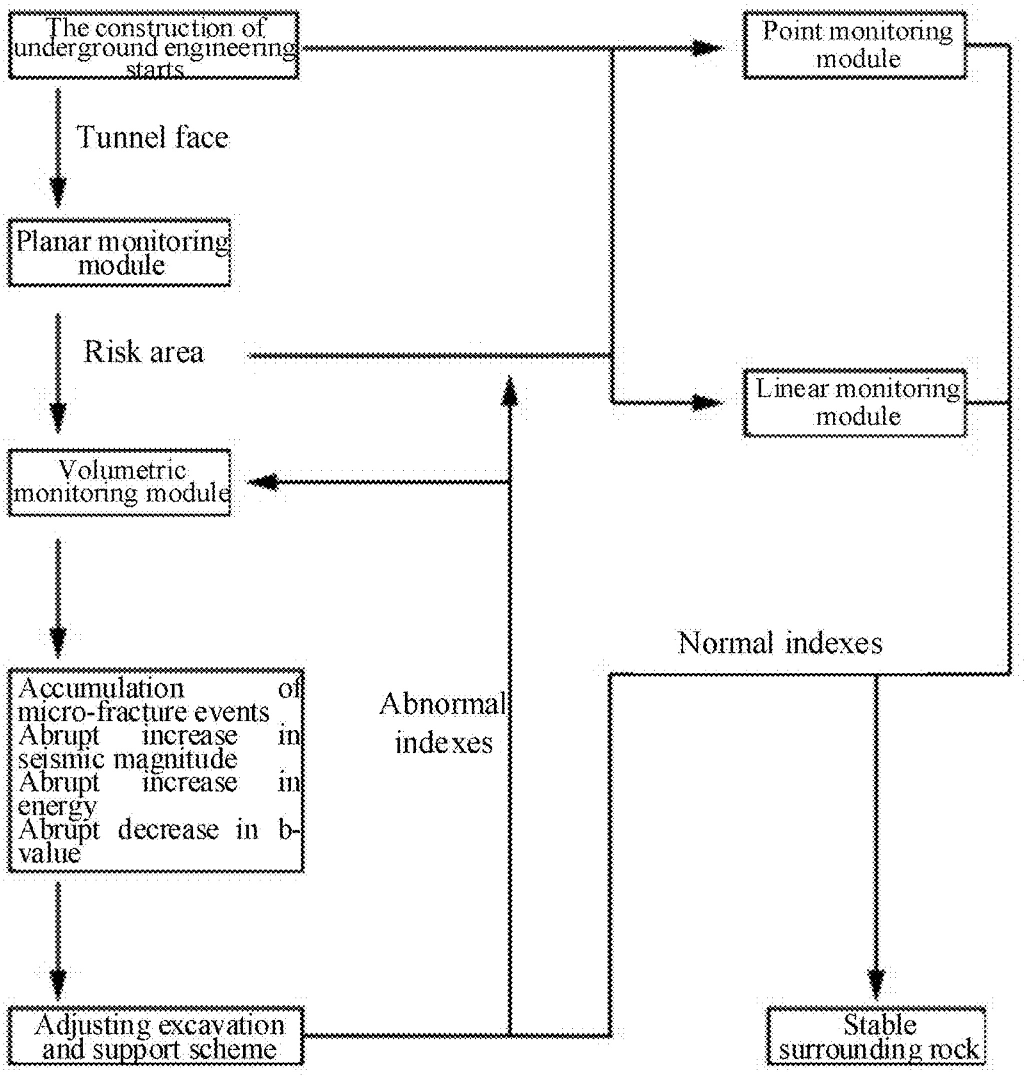
FIG. 2 is a principle block diagram of the multi-dimensional integrated monitoring system for underground engineering according to an embodiment of the present disclosure.

In a first aspect, as shown in FIG. 1, the present disclosure provides a multi-dimensional integrated monitoring system for underground engineering, being configured to be assembled to underground engineering to be excavated, the system including: point monitoring modules 1, configured to be mounted on a plurality of first monitoring sections 01 of the underground engineering; linear monitoring modules, configured to be mounted on a plurality of second monitoring sections 02 of the underground engineering; a planar monitoring module, configured to be mounted on a tunnel face 03 of the underground engineering; volumetric monitoring modules, configured to be mounted on a plurality of third monitoring sections 04 of the underground engineering; and a data analysis platform, configured for receiving and analyzing first feature information collected by the point monitoring modules 1, second feature information collected by the linear monitoring modules, third feature information collected by the planar monitoring module, and fourth feature information collected by the volumetric monitoring modules, so as to adjust an excavation and support scheme for the underground engineering; wherein the plurality of first monitoring sections 01 and the plurality of second monitoring sections 02 are respectively provided at intervals along an excavation direction of the underground engineering; and the plurality of third monitoring sections 04 are respectively positioned in risk areas 05 characterized by the third feature information and areas close to the tunnel face 03.

Specifically, the system includes four types of monitoring modules. The point monitoring module 1 is capable of monitoring parameter changes, such as displacement deformation and stress changes, at a certain critical position at a specific point. The linear monitoring module is capable of performing continuous or intermittent monitoring along a line or path to capture geological feature changes along the line. The planar monitoring module may be understood to be capable of monitoring parameter changes of an entire planar area within the planar area. The volumetric monitoring module may be understood to be capable of performing monitoring within a three-dimensional space range to provide three-dimensional seismic activity data. The four types of monitoring methods are used simultaneously, which can capture changes in different dimensions in real time, and jointly cover all key geological information from point-like areas, linear areas, and planar areas to the three-dimensional space, so as to provide all-round monitoring data.

The monitoring section of the underground engineering refers to a series of cross sections arranged in parallel along the excavation direction during the excavation of the engineering. Preferably, the monitoring sections are set in key areas or at key positions in the underground engineering along the excavation direction of the underground engineering, and the monitoring module (such as the point monitoring module 1, the linear monitoring module, and the volumetric monitoring module) is mounted on each monitoring section to monitor monitoring data of the key positions. The tunnel face 03 refers to a working face positioned at the foremost end in the excavation process, and the planar monitoring module is provided on the tunnel face 03 to know the geological conditions of the excavation area.

Specifically, the data analysis platform may summarize the data collected from different monitoring methods, analyze and process the data, provide an immediate early warning function, and timely discover and early respond to geological anomalies in the construction, so that the staff adjusts the excavation and support scheme for the underground engineering.

As a specific description of this embodiment, the first feature information, the second feature information, the third feature information and the fourth feature information may be transmitted to the data analysis platform in a wired or wireless manner for the data analysis platform to receive and process, and store the information in a database of the data analysis platform. In some embodiments, regular on-site inspections may be performed, readings of the corresponding monitoring modules may be recorded manually or by using electronic devices, and the recorded readings may be manually input or the four pieces of feature information may be input into the data analysis platform in other manners. In some embodiments, the four types of monitoring modules may perform data collection and recording in combination with automatic collection and manual recording.

As a further explanation of this embodiment, when the data carried in the third feature information are abnormal, it is possible to decide the risk areas 05 in the excavation process. After the risk areas 05 are identified through planar monitoring, the volumetric monitoring modules are deployed in a targeted manner to respond quickly and ensure that the key areas are monitored in a targeted and effective manner.

In this way, the four types of monitoring modules are all mounted on different key parts of the underground engineering to achieve comprehensive monitoring in space, different monitoring methods may capture information about the underground engineering in different aspects, and after mutual coupling, the monitoring methods may complement blank information to each other, so as to provide a more comprehensive monitoring result. The four types of monitoring modules jointly acquire parameter changes of the underground engineering in real time, and acquire real-time feature information, so as to provide more continuous monitoring data, and overcome the time delay and space limitation caused by independent monitoring methods.

In addition, the multi-dimensional unified system formed by coupling a plurality of monitoring methods can optimize the allocation of monitoring resources according to the respective monitoring results, so as to improve the monitoring efficiency, for example, the volumetric monitoring modules are deployed in the risk areas 05 monitored by the planar monitoring module.

Therefore, the multi-dimensional unified system can provide the most comprehensive monitoring data, covering all the information from the specific point to the line, the plane and the three-dimension, provide comprehensive monitoring from the local to the whole and from the surface to the interior, and monitor the safety state of the underground engineering from different angles and scales, thereby being conducive to more thoroughly explaining the geology and engineering behavior of the underground engineering, and optimizing the excavation and support scheme for the underground engineering.

In some preferred examples, the point monitoring module 1 includes a plurality of multipoint displacement meters and/or a plurality of anchor rod stress meters. The first feature information acquired by the multipoint displacement meter is displacement information, and finally the internal deformation of the surrounding rock of the underground engineering in the excavation unloading disturbance processes is obtained. The first feature information acquired by the anchor rod stress meter is stress information, and internal stress change features of the surrounding rock of the underground engineering in the excavation unloading disturbance processes is obtained.

In some examples, a plurality of multipoint displacement meters are mounted on the first monitoring sections 01 of the underground engineering. In some examples, a plurality of anchor rod stress meters are mounted on the first monitoring sections 01 of the underground engineering. And in some examples, the plurality of multipoint displacement meters and the plurality of anchor rod stress meters are mounted on the first monitoring sections 01 of the underground engineering to reveal the internal deformation and stress change features in the excavation and unloading processes.

In some preferred examples, the linear monitoring module includes a plurality of acoustic wave detectors and/or a plurality of borehole panoramic digital imagers. The second feature information collected by the acoustic wave detector is acoustic wave information. Specifically, the acoustic wave information includes an acoustic wave velocity and acoustic wave attenuation, and the rock mass quality of the surrounding rock and the influence depth of unloading relaxation as well as whether the rock mass reaches stability are finally obtained through the acquired acoustic wave information. The borehole panoramic digital imager allows to perform visual inspections underground, the underground rock stratum is directly observed by mounting camera equipment in a borehole to obtain imaging information, and the second feature information may include the imaging information. Specifically, the imaging information includes a rock stratum image, a fracture, a pore and fault information, and finally a distribution range of rock mass fractured segments is obtained.

In some examples, a plurality of acoustic wave detectors are mounted on the second monitoring sections 02 of the underground engineering. In some examples, a plurality of borehole panoramic digital imagers are mounted on the second monitoring sections 02 of the underground engineering. And in some examples, the plurality of acoustic wave detectors and the plurality of borehole panoramic digital imagers are mounted on the second monitoring sections 02 of the underground engineering, to monitor the rock mass quality, the influence depth of unloading relaxation and the range of fractured zones.

In some preferred examples, the planar monitoring module includes a plurality of advanced geological prediction geophones 31 and/or a plurality of seismic imagers 32. Under the action of a seismic source exciter, the third feature information collected by the advanced geological prediction geophones 31 is seismic data information. Specifically, the seismic data information includes at least one of relative stress, water-bearing probability, a longitudinal wave velocity, a transverse wave velocity, a longitudinal-to-transverse wave velocity ratio, Poisson's ratio, Young's modulus and a surrounding rock hazard level result map. The seismic imager 32 is a seismic imaging technology which utilizes the underground propagation velocity and path of seismic waves to obtain seismic wave information, and the third feature information may include the seismic wave information. Specifically, the seismic wave information includes wave velocity distribution, a seismic wave velocity, a three-dimensional image, and abnormal areas (a fault, a fracture, a cavity, a water-bearing stratum, and the like) for identifying underground abnormal bodies and geological structures.

In some examples, a plurality of advanced geological prediction geophones 31 are mounted on the tunnel face 03 of the underground engineering. In some examples, a plurality of seismic imagers 32 are mounted on the tunnel face 03 of the underground engineering. And in some examples, the plurality of advanced geological prediction geophones 31 and the plurality of seismic imagers 32 are mounted on the tunnel face 03 of the underground engineering to estimate the surrounding rock risk areas 05, so as to provide reference for the subsequent excavation and support adjustment and monitoring arrangement.

In some preferred examples, the volumetric monitoring module includes a plurality of microseismic sensors 4. The fourth feature information collected by microseismic monitoring is fracture information. Specifically, the fracture information includes at least one of a microseismic event, seismic magnitude, a microseismic frequency and microseismic waveform, so as to achieve risk early warning.

It can be known that the underground engineering may be generally classified into two types according to spatial forms and construction modes thereof, such as isolinear engineering and high side wall engineering. Among them, the length of the isolinear engineering is much greater than the width and height thereof, and excavation is continued according to a length direction thereof in the construction process. The high side wall engineering generally has larger space and higher side walls, and layered excavation and support may be performed in the construction process. In view of this:

with regard to the isolinear engineering, a plurality of multipoint displacement meters are arranged on two side walls, a crown and two side arch shoulders of each of the first monitoring sections 01 of the isolinear engineering, and each of the anchor rod stress meters is arranged between two adjacent multipoint displacement meters on each of the first monitoring sections 01; the plurality of acoustic wave detectors and the plurality of borehole panoramic digital imagers are respectively arranged on two side walls and a crown of each of the second monitoring sections 02 of the isolinear engineering; a plurality of advanced geological prediction geophone 31 are arranged in an array on the tunnel face 03 of the isolinear engineering, and seismic source excitation points 311 are provided between two adjacent advanced geological prediction geophones 31 and at edges of an array of the advanced geological prediction geophones 31; and a plurality of microseismic sensors 4 are arranged on two side walls of each of the third monitoring sections 04 of the isolinear engineering and positioned at different heights on the plurality of third monitoring sections 04.

With regard to the high side wall engineering, the plurality of multipoint displacement meters are arranged on two side walls, a crown and two side arch shoulders of each of the first monitoring sections 01 on a first layer of the high side wall engineering, and two side walls of each of the first monitoring sections 01 on each layer except for the first layer; each of the anchor rod stress meters is arranged between two adjacent multipoint displacement meters on each of the first monitoring sections 01; the plurality of acoustic wave detectors and the plurality of borehole panoramic digital imagers are respectively arranged on two side walls and a crown of each of the second monitoring sections 02 on the first layer of the high side wall engineering, and two side walls of each of the second monitoring sections 02 on each layer except for the first layer; the plurality of advanced geological prediction geophone 31 are arranged in an array on the tunnel face 03 of the high side wall engineering, and seismic source excitation points 311 are provided between two adjacent advanced geological prediction geophones 31 and at edges of the array of the advanced geological prediction geophones 31; the plurality of seismic imagers 32 are arranged in areas on the first layer of the high side wall engineering corresponding to bottoms of the two side walls; and the plurality of microseismic sensors 4 are dispersedly arranged in different areas of the third monitoring sections 04 on at least two layers of the high side wall engineering to form volumetric monitoring.

Among them, more descriptions of the monitoring modes of the four types of monitoring modules in the isolinear engineering and the high side wall engineering may be more comprehensively understood in the method examples below, which will not be described in detail in the example of the present disclosure.

Figure 3:
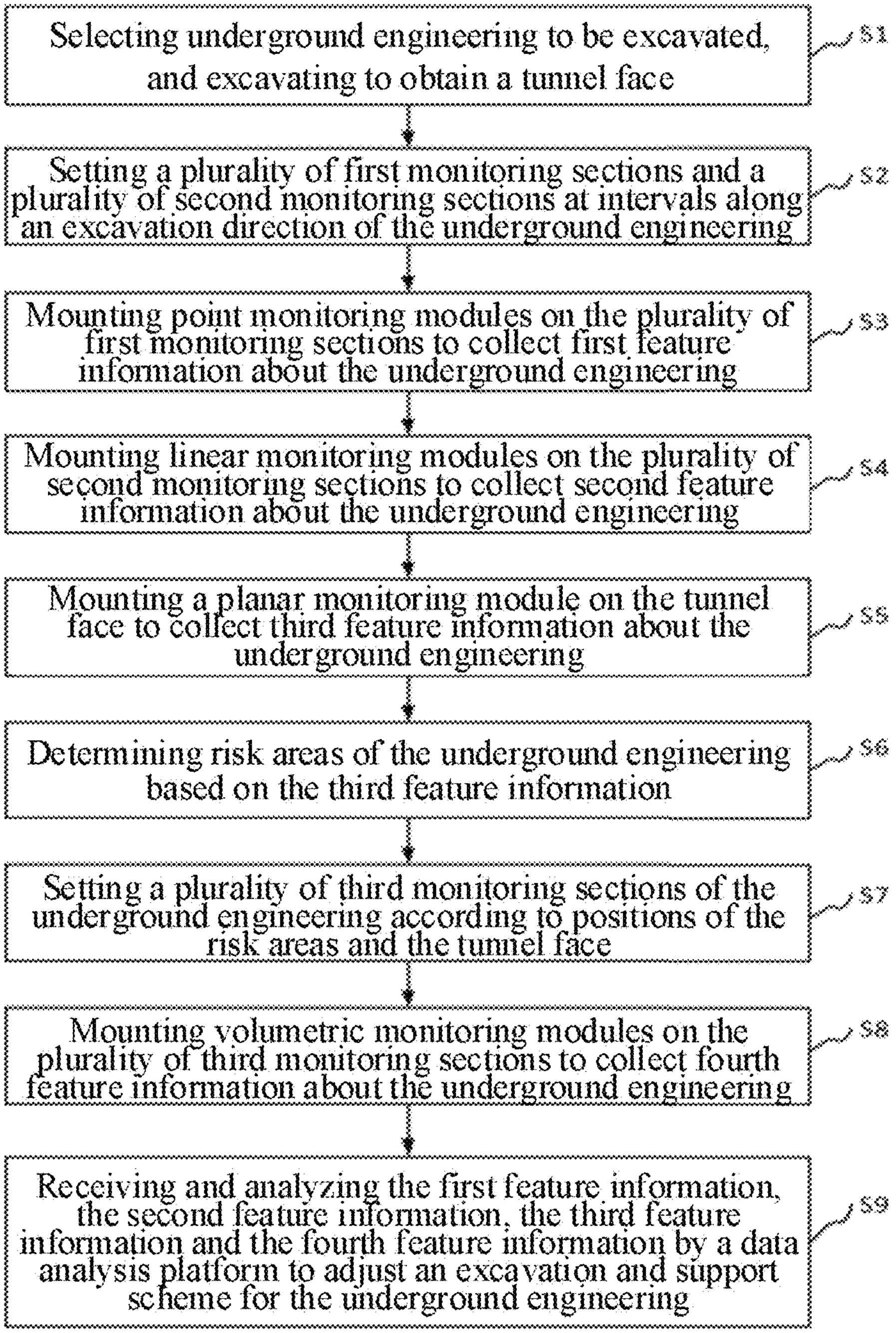
FIG. 3 is a flowchart showing the steps of a multi-dimensional integrated monitoring method for underground engineering according to an embodiment of the present disclosure.

In conjunction with the above examples, the monitoring system provided in the examples of the present disclosure has many significant improvements. Based on the same inventive concept, in a second aspect, the present disclosure further provides a multi-dimensional integrated monitoring method for underground engineering. Referring to FIG. 3, FIG. 3 shows a flowchart showing the steps of a multi-dimensional integrated monitoring method for underground engineering according to the present disclosure, wherein the method is implemented based on the multi-dimensional integrated monitoring system for underground engineering provided in the first aspect of the present disclosure, and the method includes the following steps.

S1. Selecting underground engineering to be excavated, and excavating to obtain a tunnel face 03.

Among them, the underground engineering may include the isolinear engineering and the high side wall engineering as described above. Specifically, the isolinear engineering may include underground engineering such as tunnels, highways, railways, water channels, and pipelines, and the high side wall engineering may include underground engineering such as underground commercial complexes, underground storage facilities, complex pipe galleries, and underground powerhouses of hydropower stations. With reference to FIG. 2, after a specific type of the underground engineering is selected, the construction of the underground engineering starts, the tunnel face 03 is formed by preliminary excavation, the planar monitoring module is arranged on the tunnel face 03, the point monitoring modules 1 and the linear monitoring modules are arranged along with the excavation progress, and the volumetric monitoring modules are arranged according to risk areas 05 estimated by planar monitoring.

S2. Setting a plurality of first monitoring sections 01 and a plurality of second monitoring sections 02 at intervals along an excavation direction of the underground engineering.

Specifically, before the construction of the engineering starts, detailed geological exploration is performed, and the spacing distance of the corresponding monitoring sections is set according to the quality level of the surrounding rock obtained from the geological exploration in the early stage. The worse the quality of the surrounding rock is, the shorter the spacing distance of the monitoring sections is, so as to ensure that the problems can be found in time. Illustratively, in general, the spacing distance is 20 m to 50 m, the spacing distance is 50 m if the quality of the surrounding rock is good, and the spacing distance is 20 m if the quality of the surrounding rock is poor.

S3. Mounting point monitoring modules 1 on the plurality of first monitoring sections 01 to collect first feature information about the underground engineering.

Specifically, the plurality of multipoint displacement meters and/or the plurality of anchor rod stress meters are mounted on the plurality of first monitoring sections 01 to collect displacement information and/or stress information about the underground engineering.

S4. Mounting linear monitoring modules on the plurality of second monitoring sections 02 to collect second feature information about the underground engineering.

Specifically, the plurality of acoustic wave detectors and/or the plurality of borehole panoramic digital imagers are mounted on the plurality of second monitoring sections 02 to collect acoustic wave information and/or imaging information about the underground engineering.

S5. Mounting a planar monitoring module on the tunnel face 03 to collect third feature information about the underground engineering.

Specifically, the plurality of advanced geological prediction geophones 31 are mounted on the tunnel face 03, seismic sources are excited point by point according to a preset sequence at seismic source excitation points 311, and seismic data information about the underground engineering is collected; and/or, the plurality of seismic imagers 32 are mounted on the tunnel face 03 to collect seismic data information and/or seismic wave information about the underground engineering.

S6. Determining risk areas 05 of the underground engineering based on the third feature information.

In the planar monitoring methods, the geological conditions in front of the tunnel face 03 are evaluated by a geological prediction technology, and potential geological disaster risk areas are determined. By analyzing the seismic data information, the risk areas 05 within the range of 100 m in front of the tunnel face 03 may be determined. For example, when the relative stress is relatively high, the water-bearing probability is relatively high, the wave velocity is abnormal, the rock mechanical parameters are abnormal or the surrounding rock hazard level is relatively high, it may be determined that there is the risk area 05, so as to provide reference for the subsequent excavation and support adjustment and monitoring arrangement.

The risk areas 05 are monitored by the planar monitoring methods, if the indexes collected by the point monitoring modules 1 and the linear monitoring modules are normal, it indicates that the surrounding rock tends to be stable. If the indexes are abnormal, the monitoring frequencies of the point monitoring modules 1 and the linear monitoring modules, or the monitoring frequencies of the microseismic sensors 4 may be increased in the risk areas 05.

S7. Setting a plurality of third monitoring sections 04 of the underground engineering according to positions of the risk areas 05 and the tunnel face 03.

S8. Mounting volumetric monitoring modules on the plurality of third monitoring sections 04 to collect fourth feature information about the underground engineering.

Specifically, a plurality of microseismic sensors 4 are mounted on the third monitoring sections 04 to collect fracture information about the underground engineering. Among them, the volumetric monitoring modules may continuously capture micro-fracture events inside the rock mass, and if the abnormal conditions such as the accumulation of the micro-fracture events, the abrupt increase in the seismic magnitude, the abrupt increase in energy and the abrupt decrease in the b-value occur, early warning is performed, and the excavation and support scheme is adjusted.

S9. Receiving and analyzing the first feature information, the second feature information, the third feature information and the fourth feature information by a data analysis platform to adjust an excavation and support scheme for the underground engineering.

Specifically, according to a plurality of preset monitoring durations, the first feature information, the second feature information, the third feature information and the fourth feature information corresponding to each of the preset monitoring durations are recorded, and the recorded information is transmitted to the data analysis platform. Illustratively, with regard to the point monitoring modules 1, data are recorded every few days as excavation progresses after mounting is completed. The monitoring durations of the linear monitoring modules, the planar monitoring module and the volumetric monitoring modules may be the same as or different from the monitoring duration of the point monitoring modules 1, or the monitoring may be started on the same day. Among them, the monitoring methods and the monitoring frequency may be flexibly adjusted according to the specific requirements and geological conditions of the engineering.

In summary, compared with monitoring in a single dimension or by a plurality of monitoring methods which are not coupled, a plurality of monitoring methods are coupled to achieve monitoring in multiple dimensions, so that the state and change trend of the underground engineering may be more comprehensively understood, thereby being more comprehensive, accurate and reliable in time and space, and achieving the safe dynamic control of the excavation process of the underground engineering.

Among them, the first monitoring section 01 and the second monitoring section 02 may be the same monitoring section. Preferably, the first monitoring sections 01 and the second monitoring sections 02 are alternately arranged, and the spacing distance may be flexibly adjusted.

Figure 4:
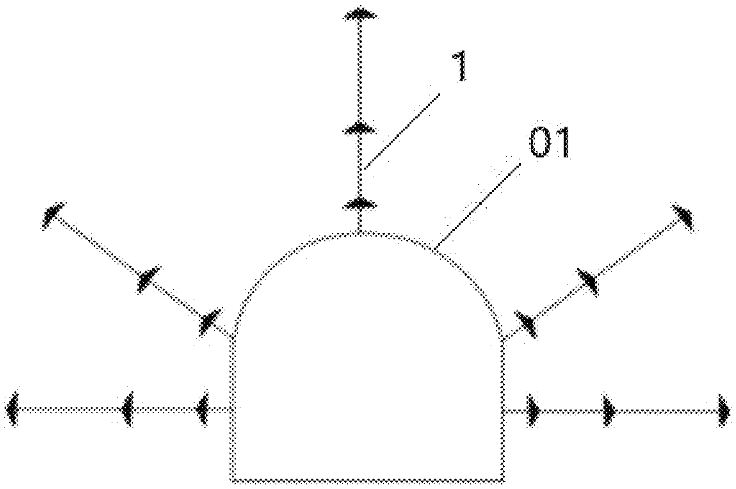
FIG. 4 is a schematic diagram showing the assembly of a first monitoring section of isolinear engineering and a point monitoring module according to an embodiment of the present disclosure.
Figure 5:
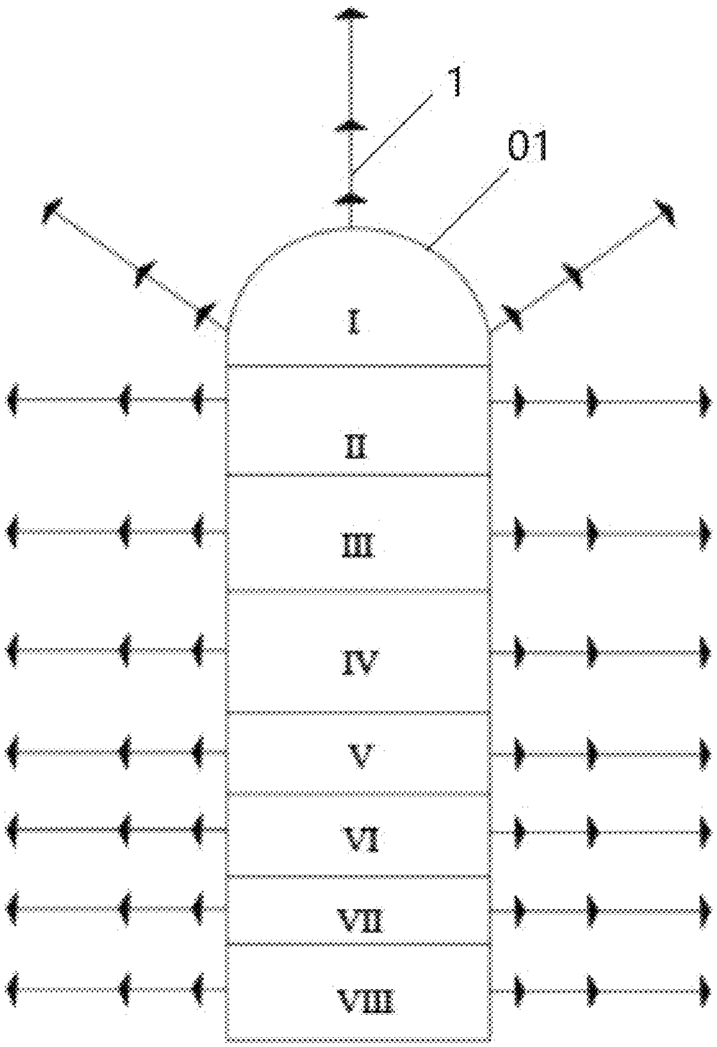
FIG. 5 is a schematic diagram showing the assembly of a first monitoring section of high side wall engineering and the point monitoring module according to an embodiment of the present disclosure.
Figure 6:
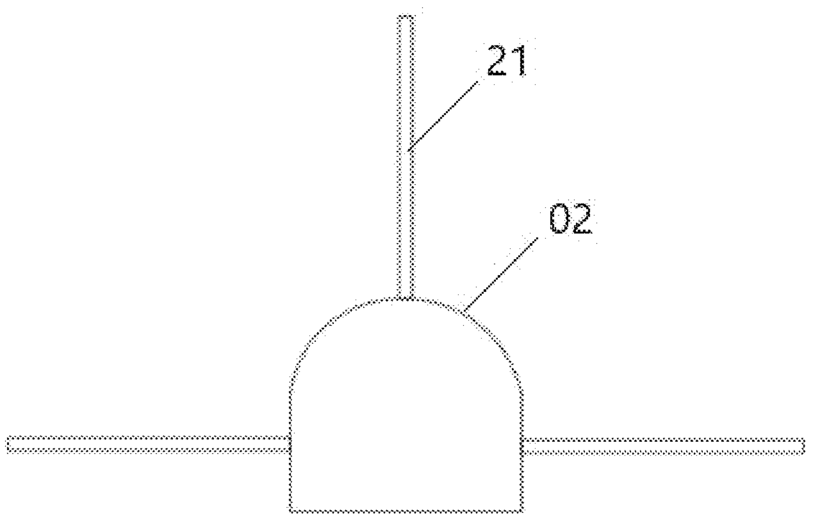
FIG. 6 is a schematic structural diagram before the assembly of a second monitoring section of the isolinear engineering and a linear monitoring module according to an embodiment of the present disclosure.
Figure 8:
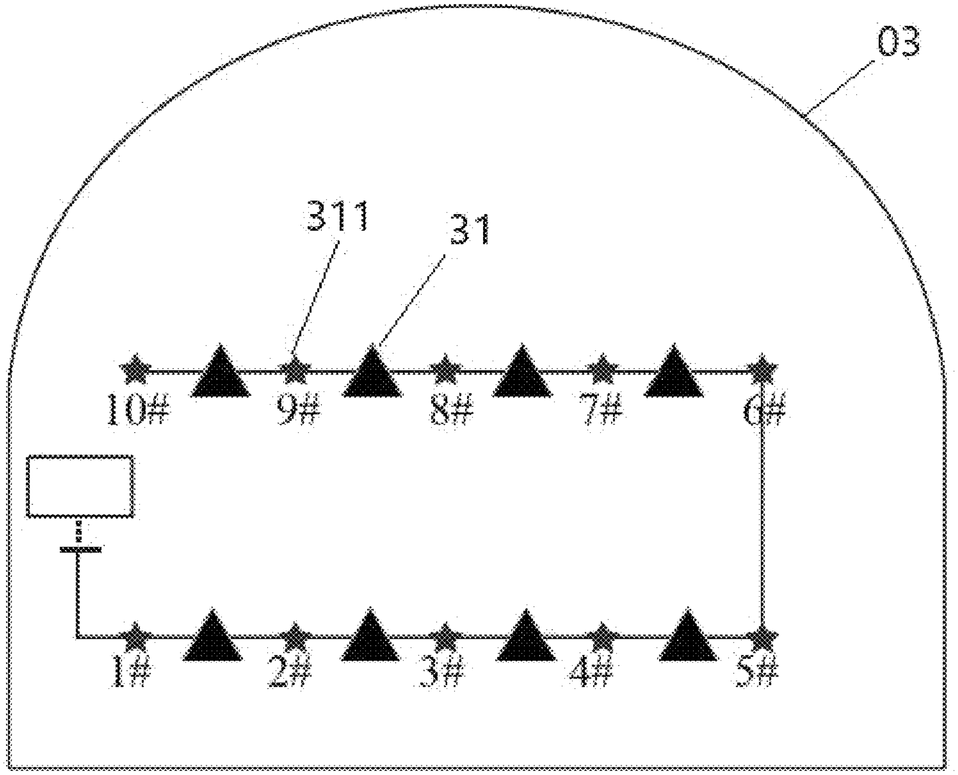
FIG. 8 is a schematic diagram showing the assembly of a tunnel face and an advanced geological prediction geophone according to an embodiment of the present disclosure.

With regard to the isolinear engineering, referring to FIG. 4, FIG. 6 and FIG. 8, FIG. 4 is a schematic diagram showing the assembly of the first monitoring section of the isolinear engineering and the point monitoring module; FIG. 6 is a schematic structural diagram before the assembly of the second monitoring section of the isolinear engineering and the linear monitoring module; and FIG. 8 is a schematic diagram showing the assembly of the tunnel face and the advanced geological prediction geophone.

As a further explanation of this example, step S3 further includes:

S31. drilling two side walls, a crown and two side arch shoulders of each of the first monitoring sections 01 of the isolinear engineering to form a plurality of mounting holes, mounting the plurality of multipoint displacement meters in some of the mounting holes, and mounting the anchor rod stress meter in the mounting hole between two adjacent multipoint displacement meters.

In this example, the multipoint displacement meter and the anchor rod stress meter are mounted at different positions on the same monitoring section with a distance, which can ensure that the collected data are consistent in space and time, thereby facilitating the analysis of the correlation between the data and optimizing the monitoring effect. However, on each of the first monitoring sections 01, the multipoint displacement meters may be arranged on two side walls, a crown and two side arch shoulders of a tunnel, and the anchor rod stress meters may be arranged on a side of these positions with a certain interval, so as to avoid mutual interference during drilling, and comprehensively monitor the deformation conditions and stress conditions of the surrounding rock of the tunnel on different parts. Moreover, the point monitoring modules 1 are arranged on the plurality of first monitoring sections 01 along a length direction of the isolinear engineering to obtain multipoint data along an axis of the tunnel, thereby improving the reliability and accuracy of the monitoring data.

Specifically, holes are drilled at designated positions on each of the first monitoring sections 01, and the hole depth and hole diameter are determined according to the specifications and monitoring requirements of the multipoint displacement meters and the anchor rod stress meters. Moreover, the multipoint displacement meters and the anchor rod stress meters are placed in boreholes to ensure close contact with the surrounding rock.

Further, step S4 further includes:

S41. drilling two side walls and a crown of each of the second monitoring sections 02 of the isolinear engineering to form a plurality of detection holes 21, and respectively arranging the plurality of acoustic wave detectors and the plurality of borehole panoramic digital imagers in the plurality of detection holes 21.

In this example, the detection holes 21 for the acoustic wave detectors and the borehole panoramic digital imagers may be shared, and the acoustic wave detectors and the borehole panoramic digital imagers are respectively mounted according to positions of the detection holes 21. Alternatively, for the same detection hole 21, after the mounting and detection of the borehole panoramic digital imagers are completed, the acoustic wave detectors are placed. Alternatively, when it needs to adjust the monitoring quantity of the acoustic wave detectors and the borehole panoramic digital imagers, some of the acoustic wave detectors/borehole panoramic digital imagers may be removed, and the newly added borehole panoramic digital imagers/acoustic wave detectors are mounted in the vacant detection holes 21.

In addition, the detection holes 21 in the same second monitoring section 02 are shared to reduce a quantity of boreholes, thereby reducing the disturbance to the rock mass, and reducing the damage and risk, and concentrated construction may be performed in the drilling process, thereby reducing the time and costs for the arrangement and removal of equipment, and improving the construction efficiency.

Further, step S5 further includes:

S51. drilling an array of holes on a tunnel face 03 of the isolinear engineering to form a plurality of geophone holes, arranging the advanced geological prediction geophone 31 in each of the geophone holes, and providing seismic source excitation points 311 between two adjacent advanced geological prediction geophones 31 and at edges of the array of the advanced geological prediction geophones 31.

In the isolinear engineering, since the engineering mainly extends along an axial direction and mainly faces the changes in geological conditions in front, the geological conditions in front of the tunnel face 03 may be effectively predicted by adopting the advanced geological prediction geophones 31 in the planar monitoring methods.

Further, step S8 further includes:

S81. drilling at different heights on two side walls of each of the third monitoring sections 04 of the isolinear engineering to form a plurality of fixing holes, and mounting the microseismic sensor 4 in each of the fixing holes by means of the resin anchor agent.

Figure 10A:
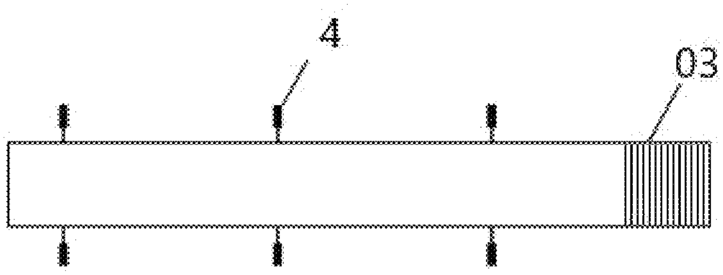
FIGS. 10A-10C show an assembly principle diagram of a microseismic sensor according to an embodiment of the present disclosure.
Figure 10B:
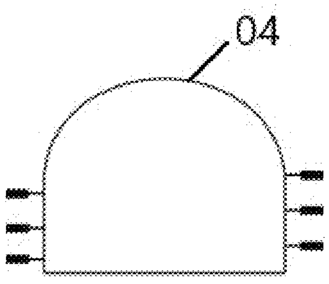
Figure 10C:
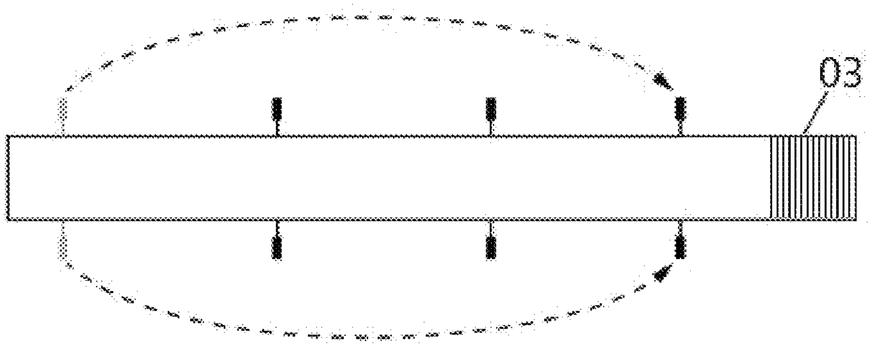

In this example, as shown in FIGS. 10A-10C, FIGS. 10A-10C show an assembly principle diagram of a microseismic sensor, among them, FIG. 10A represents a distribution mode of the microseismic sensors from a front view when the tunnel face is not advanced; FIG. 10B represents the distribution mode of the microseismic sensors from a side view when the tunnel face is not advanced; and FIG. 10C represents a movement state of the microseismic sensors from the front view in an advancing process of the tunnel face. Due to the differences between vibration signals in different height directions of the surrounding rock, in this example, the respective arrangement of the microseismic sensors 4 at different elevations of the left side wall and the right side wall can cover a wider range of space, the fracture information about the surrounding rocks at different depths is collected in the three-dimensional space, and the microdynamic changes of the underground structure at different positions which have already been non-uniform are captured, thereby avoiding the situation where the signals collected at the same height cannot accurately reflect the differences of the underground structure at different heights, and fully realizing the effectiveness of volumetric monitoring.

Further, step S8 further includes:

- S82. setting a target monitoring section close to a current tunnel face 03 according to a position of the current tunnel face 03;
- S83. transferring the microseismic sensors 4 on third monitoring sections 04 away from the tunnel face 03 among the plurality of third monitoring sections 04 to the target monitoring section; and
- S84. when the target monitoring section is positioned outside the risk areas 05, additionally providing the volumetric monitoring modules around rock masses positioned in the risk areas 05.

In this example, with continued reference to FIG. 10C, since the length of tunnel engineering is great, as the tunnel face 03 is advanced in a length direction, the positions of the microseismic sensors 4 may be continuously adjusted in this example to gradually approach the risk areas 05 obtained by the planar monitoring module, and finally the microseismic sensors 4 are all positioned in the risk areas 05, thereby ensuring that the monitoring coverage range is always positioned in the key areas. If the tunnel face 03 continues to be advanced, in the continuous forward movement process of the microseismic sensors 4, the risk areas 05 may be positioned outside the monitoring range. If the rock masses in the risk areas 05 have not been stable, a set of microseismic monitoring system is additionally arranged around the risk areas 05 to monitor the micro-fracture development of the rock masses inside the risk areas 05.

It should be understood that for the advanced most recent tunnel face 03, the planar monitoring module may be continued to be arranged on the current tunnel face 03 to predict the geological conditions in front of the current tunnel face 03, so as to obtain the most recent risk areas 05. As the tunnel face 03 continues to be advanced, finally the microseismic sensors 4 are all positioned in the most recent risk areas 05.

Illustratively, if the underground engineering is isolinear engineering of tunnels, the examples of the present disclosure will be completely described below with reference to the accompanying drawings.

Example 1 a multi-dimensional integrated monitoring method for underground engineering, includes the following steps:

S101. arranging point monitoring modules 1, introducing multipoint displacement meters, arranging first monitoring sections 01 at an interval of 20 m to 50 m according to the quality level of the surrounding rock obtained from geological exploration in the early stage, arranging a set of multipoint displacement meters on two side walls, a crown and two side arch shoulders of each of the first monitoring sections 01, recording data every 1 d to 7 d (when the displacement changes greatly, the monitoring frequency is increased) as the excavation progresses after the mounting is completed, so as to observe the internal deformation of the surrounding rock of the underground engineering in the excavation unloading disturbance processes.

The anchor rod stress meters are introduced, the monitoring sections are selected based on the same principle as the selection of the multipoint displacement meters, the monitoring section and the multipoint displacement meter share the same first monitoring section 01, and the monitoring section is horizontally spaced from the multipoint displacement meter by 1 m, so as to avoid the influence caused by mounting and drilling. The data are recorded every 1 d to 7 d as the excavation progresses after the mounting is completed, so as to observe the internal stress change features of the surrounding rock of the underground engineering in the excavation unloading disturbance processes.

S102. arranging linear monitoring modules, adopting acoustic wave detectors, arranging second monitoring sections 02 at an interval of 30 m to 100 m, providing three detection holes 21 in a crown and two side walls of each of the second monitoring sections 02, with a hole diameter of 90 mm and a hole depth of 9 m to 16 m, performing acoustic wave detection for rock every 2 d to 7 d after drilling is completed (the detection frequency is high in the early stage, and the frequency is decreased after the surrounding rock is stable in the later stage), so as to monitor the rock mass quality of the surrounding rock and the influence depth of unloading relaxation as well as whether the rock mass reaches stability.

The borehole panoramic digital imagers are introduced to comprehensively interpret the integrity of the rock mass and fracture development, boreholes for the acoustic wave detectors are shared by the borehole panoramic digital imagers, the collection frequency is the same as the acoustic wave detection frequency, and the distribution range of rock mass fractured segments is obtained after each detection.

S103. arranging a planar monitoring module, introducing an advanced geological prediction technology, performing geological prediction in front of the tunnel face 03, and arranging eight geophone holes in the tunnel face 03, with two or three upper and lower rows and the bottom row having a distance from the bottom of the tunnel face 03; according to the height of the tunnel, the spacing between two geophone holes in each row being 2 m, and four geophone holes being in each row; according to the width of the tunnel, the geophone holes being approximately uniformly distributed; placing the advanced geological prediction geophones 31 in the geophone holes, with a placement direction of the advanced geological prediction geophones 31 being parallel to a horizontal axis of the tunnel and perpendicular to the tunnel face 03; and arranging seismic source excitation points 311 between two geophone holes and at two edges of each row of geophone holes, and exciting and hammering seismic sources point by point according to an initially set sequence, so as to provide reference for the subsequent excavation and support adjustment and monitoring arrangement.

S104. arranging volumetric monitoring modules, introducing microseismic monitoring methods, taking areas in front of and behind the tunnel face 03 by 20 m and the risk areas 05 obtained through monitoring by the planar monitoring module as key monitoring areas, arranging three third monitoring sections 04 behind the tunnel face 03 by 30 m, 50 m and 70 m, respectively arranging two microseismic sensors 4 at different elevations on the left side wall and the right side wall of each of the third monitoring sections 04, with a total of six microseismic sensors 4 monitoring the range in front of and behind the tunnel face 03 by 20 m, and each time the tunnel face 03 is advanced forwards by 20 m, moving the two sensors on the third monitoring section 04 farthest from the tunnel face 03 to be behind the tunnel face 03 by 30 m, which is reciprocated.

With the advance of the tunnel face 03, the risk areas 05 obtained through monitoring by the planar monitoring module may gradually enter the monitoring range. If the tunnel face 03 continues to be advanced, in the continuous forward movement process of the microseismic sensors 4, the risk areas 05 may be positioned outside the monitoring range. At this moment, under the condition that the rock masses in the risk areas 05 have not been stable, a set of microseismic monitoring system is additionally arranged around the risk areas 05 to monitor the micro-fracture information of the rock masses in the risk areas 05, and this set of microseismic monitoring system is removed after the rock masses in the risk areas 05 are stable.

Figure 7:
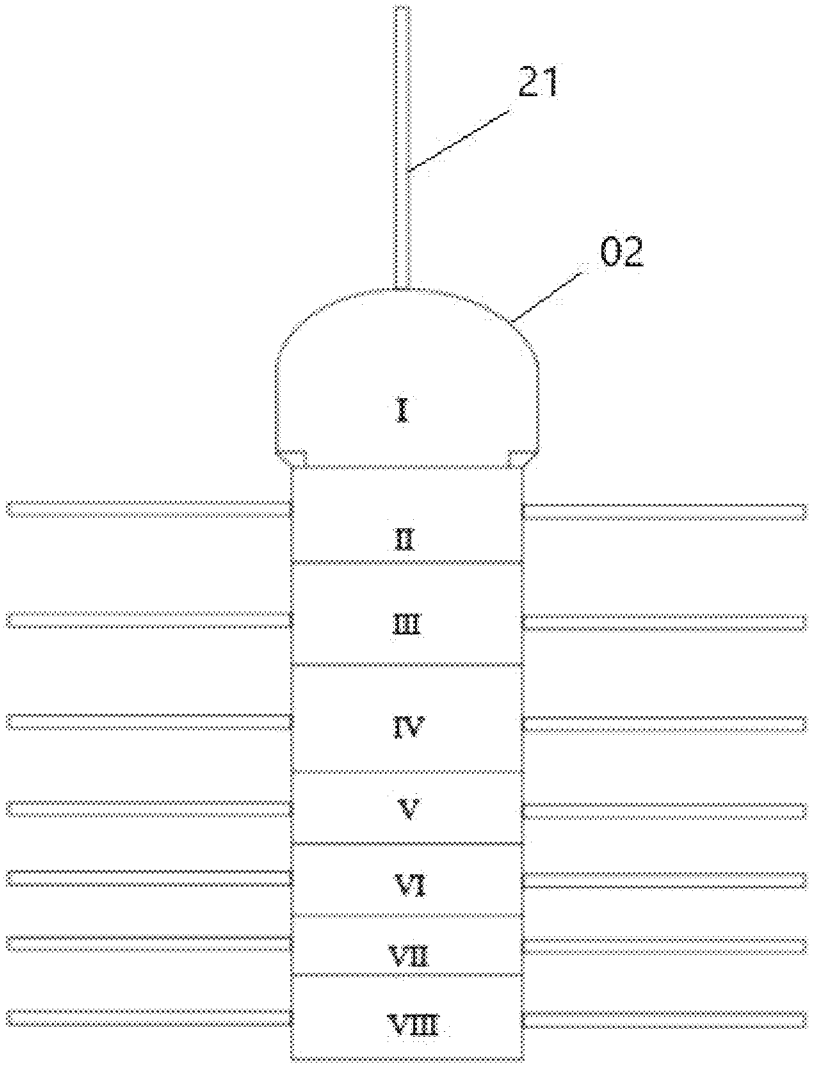
FIG. 7 is a schematic structural diagram before the assembly of a second monitoring section of the high side wall engineering and the linear monitoring module according to an embodiment of the present disclosure.
Figure 9:
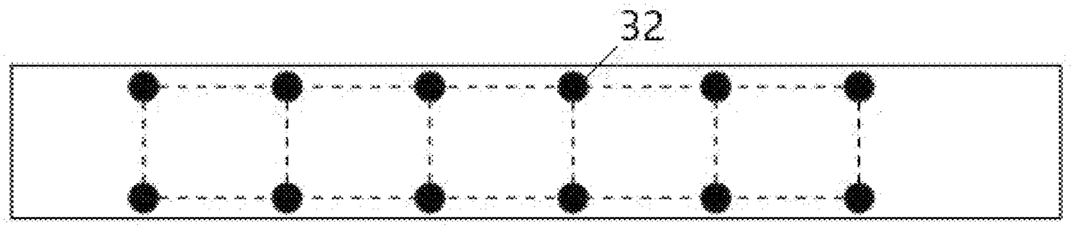
FIG. 9 is a schematic diagram showing the assembly of an excavation bottom plate of the high side wall engineering and a seismic imager according to an embodiment of the present disclosure.

With regard to the high side wall engineering, referring to FIG. 5, FIG. 7, FIG. 8 and FIG. 9, FIG. 5 is a schematic diagram showing the assembly of a first monitoring section of the high side wall engineering and the point monitoring module; FIG. 7 is a schematic structural diagram before the assembly of a second monitoring section of the high side wall engineering and the linear monitoring module; and FIG. 9 is a schematic diagram showing the assembly of an excavation bottom plate of the high side wall engineering and a seismic imager.

As a further explanation of this example, step S3 further includes:

S32. drilling two side walls, a crown and two side arch shoulders of each of the first monitoring sections 01 on a first layer of the high side wall engineering, and two side walls of each of the first monitoring sections 01 on each layer except for the first layer to form a plurality of mounting holes, mounting the plurality of multipoint displacement meters in some of the mounting holes, and mounting the anchor rod stress meter in the mounting hole between two adjacent multipoint displacement meters.

In this example, a spatial structure of the high side wall engineering is complex, and a multi-layer spatial three-dimensional structure is formed by multi-layer excavation. In the multi-layer spatial three-dimensional structure, each layer of spatial three-dimensional structure is excavated along an axial direction thereof to form one layer of spatial three-dimensional structure, after one layer of spatial three-dimensional structure is formed, the next layer of spatial three-dimensional structure is excavated along a height direction, and finally each layer of spatial three-dimensional structure overlaps in the height direction. Except that the structure of the first layer of spatial three-dimensional structure (referred to as the first layer) is slightly different, the structure of each layer of spatial three-dimensional structure (referred to as each layer) except for first layer is the same. Specifically, the first layer includes two side walls, a crown and two side arch shoulders, and each layer positioned below the first layer includes two side walls.

For each layer, reference may be made to step S31 for the feature structure that the multipoint displacement meters and the anchor rod stress meters are mounted on the first monitoring sections 01, which will not be described in detail in this example.

Further, step S4 further includes:

S42. drilling two side walls and a crown of each of the second monitoring sections 02 on the first layer of the high side wall engineering, and two side walls of each of the second monitoring sections 02 on each layer except for the first layer to form a plurality of detection holes 21, and respectively arranging the plurality of acoustic wave detectors and the plurality of borehole panoramic digital imagers in the plurality of detection holes 21.

In this example, for each layer of the high side wall engineering, it also needs to drill and excavate along an axial direction to form a spatial three-dimensional structure, so that a plurality of second monitoring sections 02 may be provided on each layer, and reference may be made to step S41 for the feature structure of the linear monitoring modules on the second monitoring sections 02, which will not be described in detail in this example.

Generally, the length of each layer of the high side wall engineering is less than that of the isolinear engineering, so that one monitoring section may be provided on each layer of the high side wall engineering.

Further, step S5 further includes:

S52. drilling an array of holes on a tunnel face 03 of the high side wall engineering to form a plurality of geophone holes, arranging the advanced geological prediction geophone 31 in each of the geophone holes, and providing seismic source excitation points 311 between two adjacent advanced geological prediction geophones 31 and at edges of the array of the advanced geological prediction geophones 31; and vertically drilling areas on the first layer of the high side wall engineering corresponding to bottoms of the two side walls to form imaging holes, and arranging the seismic imager 32 in each of the imaging holes.

In the high side wall engineering, in addition to extending along the axial direction, it also extends along the height direction, and in the excavation process along the axial direction and the height direction, the geological condition changes greatly in both the perpendicular direction and the horizontal direction. Two tunnel faces 03 are provided, one tunnel face 03 corresponds to a working face on each layer which is excavated along the horizontal direction (as shown in FIG. 8), which is the same as step S51, and the other tunnel face 03 corresponds to a working face which is excavated along the height direction, namely, an excavation bottom plate after the excavation of the first layer is finished (as shown in FIG. 9). For the change in the horizontal direction, the geological condition of the tunnel face 03 positioned in the horizontal direction is predicted by adopting the advanced geological prediction geophone 31 in the planar monitoring methods. For the change in the perpendicular direction, the geological condition of the tunnel face 03 positioned in the perpendicular direction is predicted by adopting the seismic imager 32 in the planar monitoring methods.

Preferably, a plurality of seismic imagers 32 are arranged in areas on the first layer of the high side wall engineering corresponding to bottoms of the two side walls, that is, after the excavation of the first layer is finished, the seismic imagers 32 are provided on the excavation bottom plate of the first layer to monitor the changes in seismic wave information about the multi-layer spatial three-dimensional structure positioned below the first layer, so as to achieve the comprehensive monitoring of the three-dimensional space of the high side wall engineering in combination with the geological prediction of the advanced geological prediction geophone 31 on the horizontal direction, thereby providing more three-dimensional perception, being convenient for the staff to better grasp the stability of each layer of the high side wall engineering and predict the potential collapse risk of each layer during excavation.

Further, step S8 further includes:

S85. respectively drilling different areas of the third monitoring sections 04 on at least two layers of the high side wall engineering to form a plurality of fixing holes, and mounting the microseismic sensor 4 in each of the fixing holes by means of the resin anchor agent.

In this example, in conjunction with step S52, it can be seen that the risk areas 05 may be obtained by the corresponding planar monitoring module in both the perpendicular direction and the horizontal direction, that is, the third monitoring section 04 may be positioned in the risk area 05 obtained by monitoring in the perpendicular direction and/or positioned in the risk area 05 obtained by monitoring in the horizontal direction. Illustratively, with regard to being in the risk area 05 obtained by monitoring in the perpendicular direction, namely, the bottom surface after the excavation of each layer of an underground cavity of the high side wall is finished, and according to the sizes of the risk areas 05, a plurality of microseismic sensors 4 are provided around the potential risk areas 05 in spatial "volumetric" arrangement.

Illustratively, if the underground engineering is multi-layer excavation-type underground engineering with high side walls such as an underground powerhouse of a hydropower station, the examples of the present disclosure will be completely described below with reference to the accompanying drawings.

Example 2 a multi-dimensional integrated monitoring method for underground engineering, includes the following steps:

S201. arranging point monitoring modules 1, introducing multipoint displacement meters, arranging first monitoring sections 01 at an interval of 20 m to 50 m according to the quality level of the surrounding rock obtained from geological exploration in the early stage, respectively arranging a set of multipoint displacement meters on two side walls, a crown and two side arch shoulders on the first layer, mounting the multipoint displacement meters on two side walls of each layer after the second layer, and recording data every 1 d to 7 d as the excavation progresses after the mounting is completed, so as to observe the internal deformation of the surrounding rock of the underground engineering in the excavation unloading disturbance processes.

The anchor rod stress meters are introduced, which is based on the principle the same as step S101.

S202. arranging linear monitoring modules, adopting acoustic wave detectors, arranging second monitoring sections 02 at intervals of 30 m to 100 m, providing three detection holes 21 in a crown and two side walls of each of the second monitoring sections 02 on the first layer, providing detection holes 21 in two side walls of each layer after the first layer, with a hole diameter of 90 mm and a hole depth of 9 m to 16 m, and performing acoustic wave detection for rock every 2 d to 7 d after drilling is completed, so as to monitor the rock mass quality of the surrounding rock and the influence depth of unloading relaxation as well as whether the rock mass reaches stability.

The borehole panoramic digital imagers are introduced, which is based on the principle the same as step S102.

S203. arranging a planar monitoring module, introducing an advanced geological prediction technology, performing geological prediction in front of the tunnel face 03 on the first layer, and arranging eight geophone holes in the tunnel face 03, with two or three upper and lower rows; according to the height of the tunnel, the spacing between two adjacent rows being 2 m, and four geophone holes being in each row; according to the width of the tunnel, the geophone holes being approximately uniformly distributed; the spacing between two adjacent advanced geological prediction geophones 31 in each row being 2 m, with a placement direction of the advanced geological prediction geophones 31 being parallel to a horizontal axis of the tunnel and perpendicular to the tunnel face 03; and arranging seismic source excitation points 311 between two geophone holes and at two edges of each row of geophone holes, and exciting and hammering seismic sources point by point according to an initially set sequence, so as to facilitate data collection.

The seismic imagers 32 are introduced to perform geological prediction in the perpendicular direction, after the excavation of the first layer is finished, the two side walls are vertically drilled, with a hole depth of 10 m to 25 m and a hole diameter of 75 mm according to construction factors and data accuracy, the spacing between holes in the side walls on the same side is 20 m to 40 m, the seismic imagers 32 are adopted for imaging after drilling is completed to obtain a plurality of groups of seismic wave fault images. According to the distribution law of seismic wave velocities in the fault images, in combination with the conditions such as the stratum lithology, structure and construction, weathering and unloading, and rock mass quality of the detected areas, the abnormal range and the extension direction are determined, the geological inference and explanation are performed, and the range of the risk areas 05 of the surrounding rock is estimated, so as to provide a basis for excavation and support and subsequent monitoring.

Figure 11:
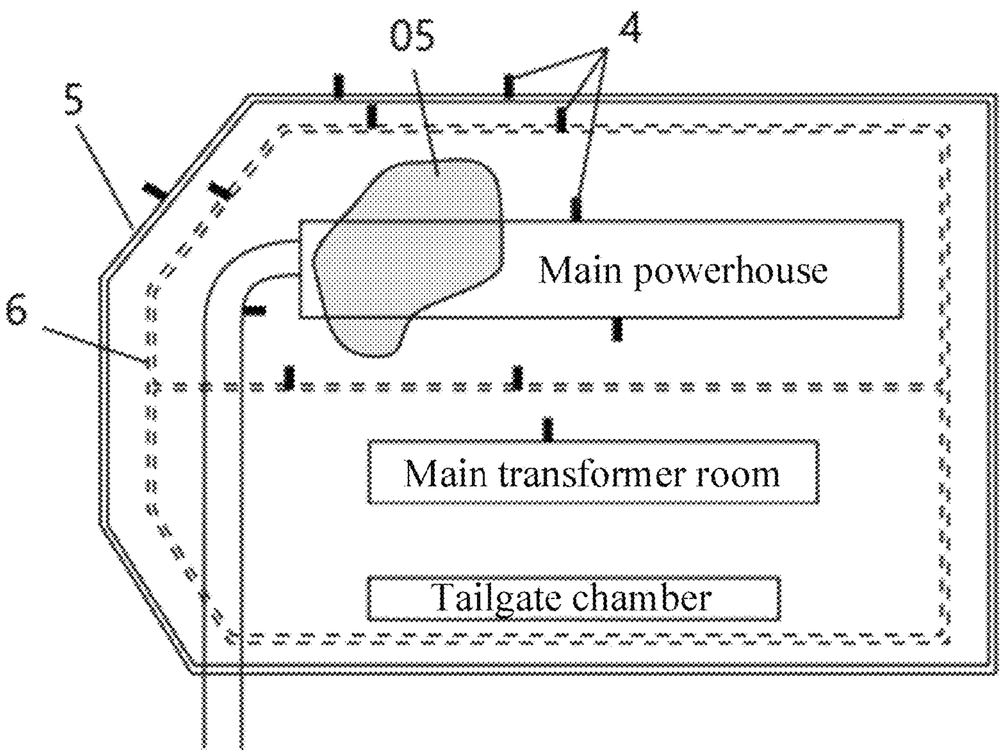
FIG. 11 is a schematic diagram showing the distribution of microseismic sensors of the high side wall engineering relative to risk areas according to an embodiment of the present disclosure.

S204. arranging volumetric monitoring modules, performing volumetric monitoring according to the potential risk areas 05 obtained from a planar monitoring result, introducing a microseismic monitoring technology. According to the sizes of the risk areas 05, arranging six or twelve microseismic sensors 4 around the potential risk areas 05, and providing the microseismic sensors 4 in spatial "volumetric" arrangement. As shown in FIG. 11, FIG. 11 shows a schematic diagram showing the distribution of microseismic sensors of the high side wall engineering relative to risk areas. If conditions permit, the microseismic sensors 4 may be respectively arranged in upper-level drainage galleries 5 and middle-level drainage galleries 6, or the microseismic sensors 4 may be arranged in access tunnels and neighboring cavities, so as to ensure that the risk areas 05 are positioned in the monitoring array as far as possible, the spacing between the microseismic sensors 4 should not be greater than 70 m, the hole depth of the fixing holes for the microseismic sensors 4 should be 1 m to 3 m, the hole diameter thereof should be 35 mm to 50 mm, and the sensors are closely adhered to the original rock by adopting the resin anchor agent.

The method embodiments are similar to the system embodiments, and reference may be made to each other for relevant parts.

It should be noted that, for the sake of concise description, the method embodiments are all expressed as a series of action combinations. However, those skilled in the art should be aware that the embodiments of this application are not limited by the described order of actions. This is because, according to the embodiments of the present disclosure, some steps can be performed in other orders or simultaneously. Secondly, those skilled in the art should also be aware that the embodiments described in the specification are all preferred embodiments, and the involved actions are not necessarily required for the embodiments of the present disclosure.

It should also be noted that in the present disclosure, terms such as “upper”, “lower”, “left”, “right”, “inner” and “outer” indicate orientations or positional relationships based on the orientations or positional relationships shown in the accompanying drawings. They are only used to facilitate the description of the present disclosure and simplify the description, rather than indicating or implying that the referred device or element must have a specific orientation, be constructed and operated in a specific orientation. Therefore, they cannot be understood as limiting the present disclosure. In addition, relational terms such as “first” and “second” are only used to distinguish one entity or operation from another entity or operation. They do not necessarily require or imply that there is any such actual relationship or order between these entities or operations, nor can they be understood as indicating or implying relative importance. Moreover, the term “comprises” or any of its other variants is intended to cover a non-exclusive inclusion. This ensures that a process, method, article, or terminal device that includes a series of elements includes not only those elements but also other elements not explicitly listed, or elements inherent to such a process, method, article, or terminal device.

What is claimed is:

1. A multi-dimensional integrated monitoring system for underground engineering, configured to be assembled to underground engineering to be excavated, comprising:

point monitoring modules, configured to be mounted on a plurality of first monitoring sections of the underground engineering;

linear monitoring modules, configured to be mounted on a plurality of second monitoring sections of the underground engineering;

a planar monitoring module, configured to be mounted on a tunnel face of the underground engineering;

volumetric monitoring modules, configured to be mounted on a plurality of third monitoring sections of the underground engineering; and a data analysis platform, configured for receiving and analyzing first feature information collected by the point monitoring modules, second feature information collected by the linear monitoring modules, third feature information collected by the planar monitoring module, and fourth feature information collected by the volumetric monitoring modules, so as to adjust an excavation and support scheme for the underground engineering; wherein the plurality of first monitoring sections and the plurality of second monitoring sections are respectively provided at intervals along an excavation direction of the underground engineering; and the plurality of third monitoring sections are respectively positioned in risk areas characterized by the third feature information and areas close to the tunnel face.

2. The multi-dimensional integrated monitoring system for the underground engineering according to claim 1, wherein each of the point monitoring modules comprises a plurality of multipoint displacement meters and/or a plurality of anchor rod stress meters; and each of the plurality of multipoint displacement meters is configured for collecting displacement information about the underground engineering, each of the plurality of anchor rod stress meters is configured for collecting stress information about the underground engineering, and the first feature information comprises the displacement information and/or the stress information;

each of the linear monitoring modules comprises a plurality of acoustic wave detectors and/or a plurality of borehole panoramic digital imagers; and each of the plurality of acoustic wave detectors is configured for collecting acoustic wave information about the underground engineering, each of the plurality of borehole panoramic digital imagers is configured for collecting imaging information about the underground engineering, and the second feature information comprises the acoustic wave information and/or the imaging information;

the planar monitoring module comprises a plurality of advanced geological prediction geophones and/or a plurality of seismic imagers, and each of the plurality of advanced geological prediction geophones is configured for collecting seismic data information about the underground engineering; and each of the plurality of seismic imagers is configured for collecting seismic wave information about the underground engineering, and the third feature information comprises the seismic data information and/or the seismic wave information;

each of the volumetric monitoring modules comprises a plurality of microseismic sensors, each of the plurality of microseismic sensors is configured for collecting fracture information about the underground engineering, and the fourth feature information comprises the fracture information;

wherein the seismic data information comprises at least one of relative stress, water-bearing probability, a longitudinal wave velocity, a transverse wave velocity, a longitudinal-to-transverse wave velocity ratio, Poisson’s ratio, Young’s modulus, and a surrounding rock hazard level result map; and the seismic wave information comprises at least one of wave velocity distribution, a three-dimensional image, and an abnormal area; and the fracture information comprises at least one of a microseismic event, seismic magnitude, a microseismic frequency, and microseismic waveform.

3. The multi-dimensional integrated monitoring system for the underground engineering according to claim 2, wherein the underground engineering comprises isolinear engineering;

the plurality of multipoint displacement meters are arranged on two side walls, a crown, and two side arch shoulders of each of the plurality of first monitoring sections of the isolinear engineering, and each of the plurality of anchor rod stress meters is arranged between two adjacent multipoint displacement meters on each of the plurality of first monitoring sections;

the plurality of acoustic wave detectors and the plurality of borehole panoramic digital imagers are respectively arranged on two side walls and a crown of each of the plurality of second monitoring sections of the isolinear engineering;

the plurality of advanced geological prediction geophones are arranged in an array on the tunnel face of the isolinear engineering, and seismic source excitation points are arranged between two adjacent advanced geological prediction geophones and at edges of the array of the plurality of advanced geological prediction geophones; and the plurality of microseismic sensors are arranged on two side walls of each of the plurality of third monitoring sections of the isolinear engineering, and positioned at different heights on the plurality of third monitoring sections.

4. The multi-dimensional integrated monitoring system for the underground engineering according to claim 2, wherein the underground engineering comprises high side wall engineering;

the plurality of multipoint displacement meters are arranged on two side walls, a crown, and two side arch shoulders of each of the plurality of first monitoring sections on a first layer of the high side wall engineering, and on the two side walls of each of the plurality of first monitoring sections on each layer except for the first layer; and each of the plurality of anchor rod stress meters is arranged between two adjacent multipoint displacement meters on each of the plurality of first monitoring sections;

the plurality of acoustic wave detectors and the plurality of borehole panoramic digital imagers are respectively arranged on two side walls and a crown of each of the plurality of second monitoring sections on the first layer of the high side wall engineering, and on the two side walls of each of the plurality of second monitoring sections on each layer except for the first layer;

the plurality of advanced geological prediction geophones are arranged in an array on the tunnel face of the high side wall engineering, and seismic source excitation points are provided between two adjacent advanced geological prediction geophones and at edges of the array of the plurality of advanced geological prediction geophones; and the plurality of seismic imagers are arranged in areas on the first layer of the high side wall engineering corresponding to bottoms of the two side walls; and the plurality of microseismic sensors are dispersedly arranged in different areas of the plurality of third monitoring sections on at least two layers of the high side wall engineering.

5. A multi-dimensional integrated monitoring method for underground engineering, wherein the multi-dimensional integrated monitoring method is implemented based on the multi-dimensional integrated monitoring system for the underground engineering according to claim 1, and the multi-dimensional integrated monitoring method comprises:

selecting the underground engineering to be excavated, and excavating to obtain the tunnel face;

setting the plurality of first monitoring sections and the plurality of second monitoring sections at the intervals along the excavation direction of the underground engineering;

mounting the point monitoring modules on the plurality of first monitoring sections to collect the first feature information about the underground engineering;

mounting the linear monitoring modules on the plurality of second monitoring sections to collect the second feature information about the underground engineering;

mounting the planar monitoring module on the tunnel face to collect the third feature information about the underground engineering;

determining the risk areas of the underground engineering based on the third feature information;

setting the plurality of third monitoring sections of the underground engineering according to positions of the risk areas and the tunnel face;

mounting the volumetric monitoring modules on the plurality of third monitoring sections to collect the fourth feature information about the underground engineering; and receiving and analyzing the first feature information, the second feature information, the third feature information, and the fourth feature information by the data analysis platform to adjust the excavation and support scheme for the underground engineering.

6. The multi-dimensional integrated monitoring method for the underground engineering according to claim 5, wherein mounting the point monitoring modules on the plurality of first monitoring sections to collect the first feature information about the underground engineering comprises:

mounting a plurality of multipoint displacement meters and/or a plurality of anchor rod stress meters on the plurality of first monitoring sections to collect displacement information and/or stress information about the underground engineering; wherein mounting the linear monitoring modules on the plurality of second monitoring sections to collect the second feature information about the underground engineering comprises:

mounting a plurality of acoustic wave detectors and/or a plurality of borehole panoramic digital imagers on the plurality of second monitoring sections to collect acoustic wave information and/or imaging information about the underground engineering; wherein mounting the planar monitoring module on the tunnel face to collect the third feature information about the underground engineering comprises:

mounting a plurality of advanced geological prediction geophones on the tunnel face, exciting seismic sources point by point according to a preset sequence at seismic source excitation points, and collecting seismic data information about the underground engineering; the seismic data information comprising at least one of relative stress, water-bearing probability, a longitudinal wave velocity, a transverse wave velocity, a longitudinal-to-transverse wave velocity ratio, Poisson's ratio, Young's modulus, and a surrounding rock hazard level result map; and/or mounting a plurality of seismic imagers on the tunnel face to collect seismic wave information about the underground engineering; the seismic wave information comprising at least one of wave velocity distribution, a three-dimensional image, and an abnormal area; wherein mounting the volumetric monitoring modules on the plurality of third monitoring sections to collect the fourth feature information about the underground engineering comprises:

mounting a plurality of microseismic sensors on the third monitoring sections to collect fracture information about the underground engineering; the fracture information comprising at least one of a microseismic event, seismic magnitude, a microseismic frequency, and microseismic waveform.

7. The multi-dimensional integrated monitoring method for the underground engineering according to claim 6, wherein the underground engineering comprises isolinear engineering;

mounting the point monitoring modules on the plurality of first monitoring sections comprises:

drilling two side walls, a crown, and two side arch shoulders of each of the plurality of first monitoring sections of the isolinear engineering to form a plurality of mounting holes, mounting the plurality of multipoint displacement meters in some of the plurality of mounting holes, and mounting an anchor rod stress meter in a mounting hole between two adjacent multipoint displacement meters;

mounting the linear monitoring modules on the plurality of second monitoring sections comprises:

drilling two side walls and a crown of each of the plurality of second monitoring sections of the isolinear engineering to form a plurality of detection holes, and respectively arranging the plurality of acoustic wave detectors and the plurality of borehole panoramic digital imagers in the plurality of detection holes;

mounting the planar monitoring module on the tunnel face comprises:

drilling an array of holes on the tunnel face of the isolinear engineering to form a plurality of geophone holes, arranging an advanced geological prediction geophone in each of the plurality of geophone holes, and providing seismic source excitation points between two adjacent advanced geological prediction geophones and at edges of an array of the plurality of advanced geological prediction geophones; and mounting the volumetric monitoring modules on the plurality of third monitoring sections comprises:

drilling at different heights on two side walls of each of the plurality of third monitoring sections of the isolinear engineering to form a plurality of fixing holes, and mounting a microseismic sensor in each of the plurality of fixing holes by means of a resin anchor agent.

8. The multi-dimensional integrated monitoring method for the underground engineering according to claim 7, wherein mounting the volumetric monitoring modules on the plurality of third monitoring sections further comprises:

setting a target monitoring section adjacent to a current tunnel face according to a position of the current tunnel face;

transferring the microseismic sensor on a third monitoring section away from the tunnel face among the plurality of third monitoring sections to the target monitoring section; and when the target monitoring section is positioned outside the risk areas, additionally providing the volumetric monitoring modules around rock masses positioned in the risk areas.

9. The multi-dimensional integrated monitoring method for the underground engineering according to claim 6, wherein the underground engineering comprises high side wall engineering;

mounting the point monitoring modules on the plurality of first monitoring sections comprises:

drilling two side walls, a crown, and two side arch shoulders of each of the plurality of first monitoring sections on a first layer of the high side wall engineering, and two side walls of each of the plurality of first monitoring sections on each layer except for the first layer to form a plurality of mounting holes, mounting the plurality of multipoint displacement meters in some of the plurality of mounting holes, and mounting an anchor rod stress meter in a mounting hole between two adjacent multipoint displacement meters;

mounting the linear monitoring modules on the plurality of second monitoring sections comprises:

drilling two side walls and a crown of each of the plurality of second monitoring sections on the first layer of the high side wall engineering, and the two side walls of each of the plurality of second monitoring sections on each layer except for the first layer to form a plurality of detection holes, and respectively arranging the plurality of acoustic wave detectors and the plurality of borehole panoramic digital imagers in the plurality of detection holes;

mounting the planar monitoring module on the tunnel face comprises:

drilling an array of holes on the tunnel face of the high side wall engineering to form a plurality of geophone holes, arranging an advanced geological prediction geophone in each of the plurality of geophone holes, and providing seismic source excitation points between two adjacent advanced geological prediction geophones and at edges of an array of the plurality of advanced geological prediction geophones; and vertically drilling areas on the first layer of the high side wall engineering corresponding to bottoms of the two side walls to form imaging holes, and arranging a seismic imager in each of the imaging holes; and mounting the volumetric monitoring modules on the plurality of third monitoring sections comprises:

respectively drilling different areas of the plurality of third monitoring sections on at least two layers of the high side wall engineering to form a plurality of fixing holes, and mounting a microseismic sensor in each of the plurality of fixing boles by means of a resin anchor agent.

10. The multi-dimensional integrated monitoring method for the underground engineering according to claim 5, wherein setting the plurality of first monitoring sections and the plurality of second monitoring sections at the intervals along the excavation direction of the underground engineering comprises:

obtaining a surrounding rock quality level of the underground engineering through a geological exploration technology in an early stage;

setting a spacing distance corresponding to monitoring sections according to the surrounding rock quality level; and setting the plurality of first monitoring sections and the plurality of second monitoring sections according to the spacing distance; and receiving and analyzing the first feature information, the second feature information, the third feature information, and the fourth feature information by the data analysis platform comprises:

according to a plurality of preset monitoring durations, recording the first feature information, the second feature information, the third feature information, and the fourth feature information corresponding to each of the plurality of preset monitoring durations, and transmitting recorded information to the data analysis platform.

* * * * *